US005818998A

United States Patent [19]

Harris et al.

[11] Patent Number: 5,818,998

[45] Date of Patent: Oct. 6, 1998

[54] COMPONENTS FOR FIBER-OPTIC MATRIX DISPLAY SYSTEMS

[75] Inventors: Laura Lee Harris; Jeff Olsen, both of Eugene, Oreg.

[73] Assignee: Inwave Corporation, Eugene, Oreg.

[21] Appl. No.: 625,729

[22] Filed: Mar. 29, 1996

Related U.S. Application Data

[63] Continuation-in-part of Ser. No. 211,235, Mar. 25, 1994, Pat. No. 5,532,711, and Ser. No. 219,618, Mar. 29, 1994, Pat. No. 5,428,365.

[51] Int. Cl.[6] .......... G02B 6/04

[52] U.S. Cl. .......... 385/901; 385/115; 385/121; 362/32

[58] Field of Search .......... 385/901, 115, 385/116, 119, 120, 121; 362/32

[56] References Cited

U.S. PATENT DOCUMENTS

| | | | |
|---|---|---|---|
| 3,815,986 | 6/1974 | Darbee | 355/1 |
| 3,950,074 | 4/1976 | Tanaka | 350/96 |
| 3,963,326 | 6/1976 | Buchert | 350/266 |
| 4,279,089 | 7/1981 | Murakami | 40/547 |
| 4,299,447 | 11/1981 | Soltan et al. | 350/334 |
| 4,777,571 | 10/1988 | Morgan | 362/32 |
| 4,780,798 | 10/1988 | Iida | 362/32 |
| 4,839,635 | 6/1989 | Harris et al. | 340/752 |
| 4,917,448 | 4/1990 | Oppenheimer | 350/96.1 |
| 5,066,947 | 11/1991 | Du Castel | 340/815 |
| 5,101,466 | 3/1992 | Reidinger | 385/115 |
| 5,129,032 | 7/1992 | Kawai | 385/901 |
| 5,295,216 | 3/1994 | Halter | 385/120 |
| 5,369,554 | 11/1994 | Erion | 362/31 |
| 5,375,045 | 12/1994 | Ruud et al. | 362/147 |
| 5,384,882 | 1/1995 | Shimamune et al. | 385/116 |
| 5,394,498 | 2/1995 | Hinterlong et al. | 385/115 |
| 5,400,424 | 3/1995 | Williams | 385/76 |
| 5,428,365 | 6/1995 | Harris et al. | 345/55 |
| 5,463,709 | 10/1995 | Terao et al. | 385/85 |
| 5,465,315 | 11/1995 | Sakai et al. | 385/116 |
| 5,486,984 | 1/1996 | Miller | 362/32 |

FOREIGN PATENT DOCUMENTS

| | | | |
|---|---|---|---|
| 1380899 | 1/1975 | United Kingdom | G02B 5/16 |
| 9306584 | 4/1993 | WIPO | G09G 3/20 |

*Primary Examiner*—John Ngo
*Attorney, Agent, or Firm*—Stoel Rives LLP

[57] ABSTRACT

A lightweight display system (10) includes an output matrix (34) of output terminals (28) of optical conductors (30) supported on a preferably flexible substrate (16) by terminal housings (20). Optical conductors (30) are collated into an input matrix (34) that receives light containing a source image (39) from projector (40). Light propagates through optical conductors (30) and exits output terminals (28) to form an enlarged display image (31) that corresponds to the source image. Preferred embodiments of display screen (12) are collapsible and facilitate transportation and reassembly.

10 Claims, 14 Drawing Sheets

COMPONENTS FOR FIBER-OPTIC MATRIX DISPLAY SYSTEMS

This application is a continuation-in-part of U.S. patent application Ser. No. 08/211,235, filed Mar. 25, 1994, now U.S. Pat. No. 5,532,711, which claims priority under 35 USC § 371 from International Application No. PCT/US91/07329, filed Sep. 29, 1991; and this application is a CIP of and claims priority under 35 USC § 119 from International Application No. PCT/US95/03845, filed Mar. 29, 1995, which is a CIP of and claims priority from U.S. patent application Ser. No. 08/219,618, filed Mar. 29, 1994, now U.S. Pat. No. 5,428,365, issued Jun. 27, 1995.

TECHNICAL FIELD

The present invention relates to display systems and, in particular, to large display systems or signboards for presenting varying alpha-numeric, graphic, and animated images to large audiences.

BACKGROUND OF THE INVENTION

Several methods and display systems have been devised to generate large, illuminated, multi-colored, quickly changeable graphic displays for the purposes of advertising, entertainment, and the general dissemination of graphic information, both images and text. Most of these systems employ output matrices of electrically powered picture elements such as incandescent lamps, light-emitting diodes, cathode-ray tubes, electro-mechanical "flip" elements, or liquid crystal elements. As a result, these display screens typically need large numbers of electrical conductors, associated connectors, and picture element fixtures and require large, rigid structures to maintain proper alignment and surface geometry. These displays are often quite heavy and require substantial electrical power for their operation. Considerable expense and effort must be expended to transport, set up, power, and maintain such displays, particularly larger versions having surface areas of greater than 9 $m^2$.

SUMMARY OF THE INVENTION

An object of the invention is, therefore, to provide a collapsible display screen having a flexible substrate for use in a fiber optic display system, wherein the substrate is sufficiently flexible to conform to the contours of a nonplanar screen support surface.

An advantage of the invention is that it provides a display system for presenting varying images with good image quality and color animation capabilities.

Another advantage of the invention is that it provides a relatively inexpensive and low maintenance display system and method that eliminate or substantially reduce the use and number of electrical elements to substantially decrease the amount of energy used by the system and provide a consequent reduction in size and weight of an associated support structure necessary to maintain surface geometry of the display screen and alignment of its elements.

A further advantage of the invention is that it provides a display screen that has packing volume dimensions that are considerably smaller than the usable surface area of the display screen to facilitate its storage and transportation.

Still another advantage of the invention is that it provides a display system that can be easily mounted on surfaces of different contours and shapes and in locations unable to support heavier display systems.

The display screen of the present invention is preferably employed in a display system that includes a projector for displaying varying alpha-numeric and graphic images on a passive display screen requiring no electrical connections or active switching or gain media. The display system has a large number of optical conductors with output and input terminals positioned at their opposite ends. The output terminals are spaced apart and preferably supported by an equal number of terminal housings affixed to a preferably thin, flexible substrate to form the display screen. The optical conductors are gathered behind the substrate, and their input terminals are collated into a launch grid with the input terminals having a positional arrangement corresponding to that of the output terminals of the display screen.

The launch grid preferably includes a heat dissipating framework for mounting the input terminals of the optical conductors into a closely packed arrangement occupying a minimum amount of space.

The projector includes a high intensity illumination source, an imaging medium and associated support devices, thermal management components, and a launch grid receptacle for receiving the optical conductor input terminals. The imaging medium contains source images held at or very near the surface of the input terminals which are fixed into position by the launch grid receptacle of the projector.

High intensity light directed at the imaging medium projects the source images directly into the input terminals of the optical conductors without the need for intermediate lenses, mirrors, or other optical elements.

Light containing these source images is divided into a large number of small parts as it is received by the input terminals and then propagates through the optical conductors to the output terminals, emanating as an expanded sized display image corresponding to the source image received by the input terminals.

Distant observers see the entire plurality of output terminals and the projected image portions, and thereby perceive the display image as a whole.

DETAILED DESCRIPTION OF PREFERRED EMBODIMENTS

Figure 1A:
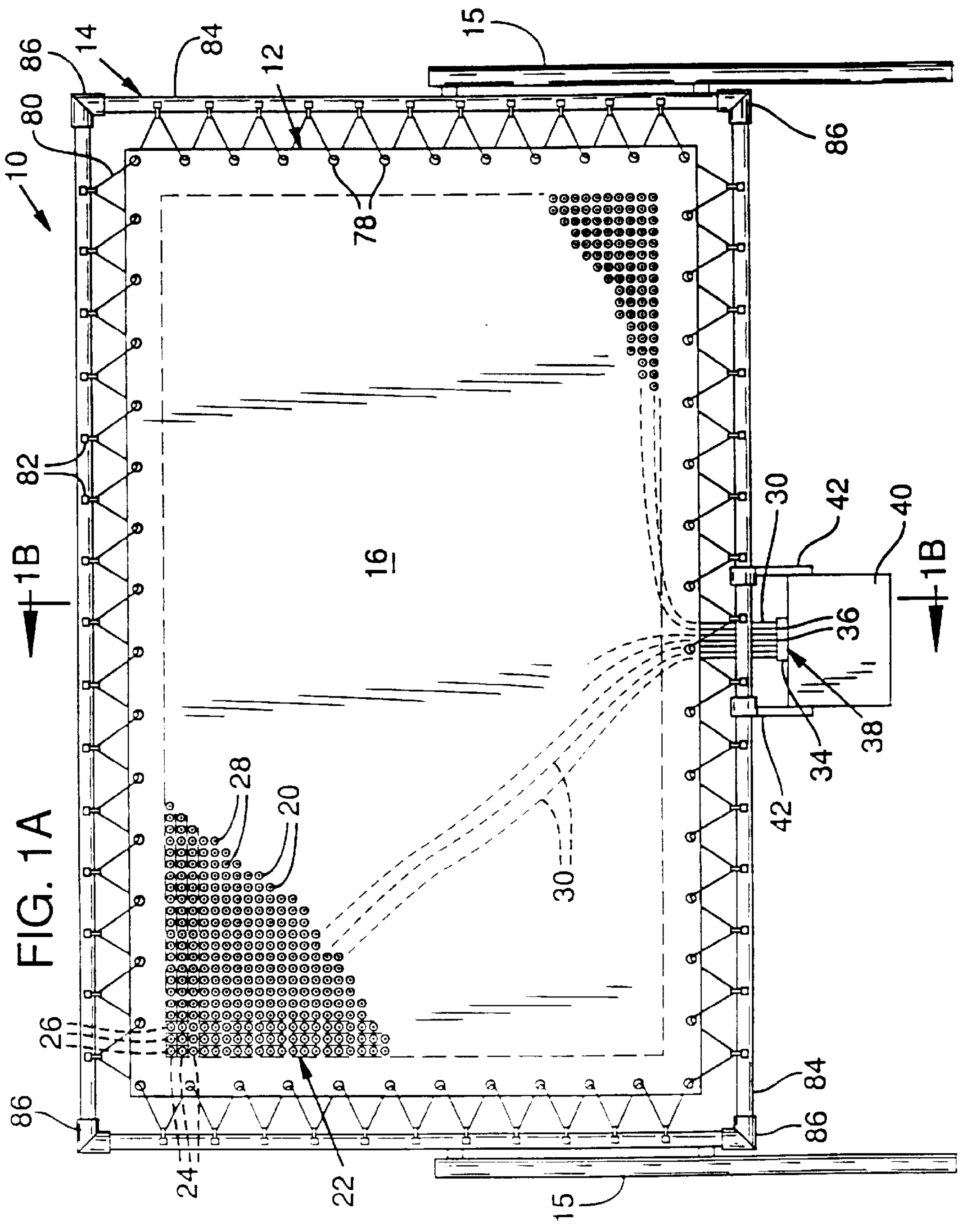
FIG. 1A is a front elevation view of a preferred embodiment of a display system of the present invention.
Figure 1B:
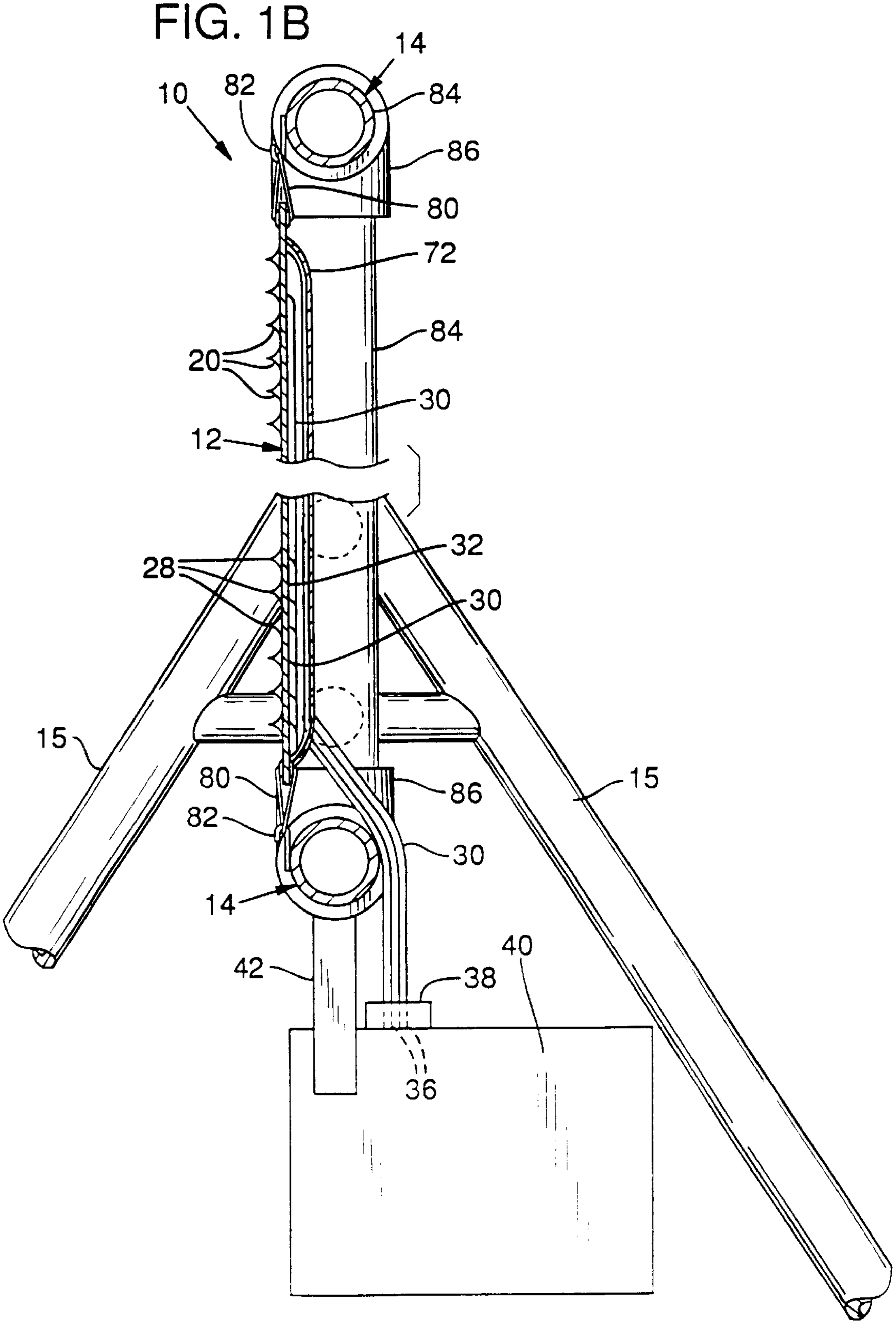
FIG. 1B is a sectional view taken along lines 1B—1B of FIG. 1A.

FIGS. 1A and 1B show respective front elevation and sectional side views of a preferred embodiment of display system 10 of the present invention. Display system 10 preferably includes a display screen 12 supported by a lightweight rigid framework 14 employing "A-frame" style stands 15 on either side to hold it upright. Display screen 12 is preferably 2.5–20 $m^2$ and includes a flexible, durable substrate 16 of 200–300 $g/m^2$ polyester knit fabric, such as Advertex Lite™ made by Snyder Manufacturing Co. The fabric is preferably coated with vinyl, urethane, or the like to environmentally and dimensionally stabilize the knit as well as provide a surface suitable for bonding adhesive layers 18 (FIG. 3A) and terminal housings 20. Although a black substrate 16 provides maximum visual performance of display screen 12, other colors may be employed as dictated by aesthetic considerations.

Display screen 12 also preferably includes a rectangular display matrix 22 of spaced apart rows 24 and columns 26 of output terminals 28 of optical conductors 30 (of which only a limited number are shown partly in phantom). Output terminals 28 are mutually spaced apart by a distance of typically 25–130 mm across the surface of substrate 16. The distance between output terminals 28 substantially determines the resolution of display image 31 (FIG. 2), described later in detail. A decrease in the distance between output terminals 28 results in increased labor and material costs associated with adding more terminal housings 20 to display screen 12.

Optical conductors 30 lie substantially flat against or run substantially parallel to rear surface 32 of substrate 16 and are collated into an input matrix 34 (FIG. 5A) containing input terminals 36.

Optical conductors 30 connect input matrix 34 to display matrix 22 in a prescribed pattern and provide for the transmission of light from input matrix 34 to display matrix 22. Input terminals 36 are separately connected on a one-to-one basis by optical conductors 30 to corresponding output terminals 28.

The relative locations of input terminals 36 in input matrix 34 are geometrically similar to the relative locations of output terminals 28 in display matrix 22.

For example, an input terminal 36 in the second row and fifth column of input matrix 34 would be connected to a corresponding output terminal 28 in the second row and fifth column of display matrix 22 on display screen 12. Thus, if rows of input terminals 36 are offset to maximize tight packing within launch grid 38, then rows of output terminals 28 of display matrix 22 are offset to correspond to the relative positioning of input terminals 36.

The input matrix 34 receives an optical source image 39 (FIG. 6A) projected from a source such as a slide, film, video, or laser projector 40 secured to framework 14 by a pair of stabilizing arms 42. Optical conductors 30 receive light at their respective input terminals 36, propagate the light through optical conductors 30, and project the light out of their respective output terminals 28. Input terminals 36 and output terminals 28 are formed from ends of optical conductors 30 by having the optical conductors cleanly severed at right angles to their longitudinal axes and having the axial ends generated thereby polished to provide smooth and clear surfaces.

Optical conductors 30 preferably comprise long and thin waveguides such as 0.75–1.0 mm diameter, polymethylmethacrylate optical fibers having a fluorinated polymer cladding and exhibiting fairly low losses of around 0.17 dB/m.

Figure 2:
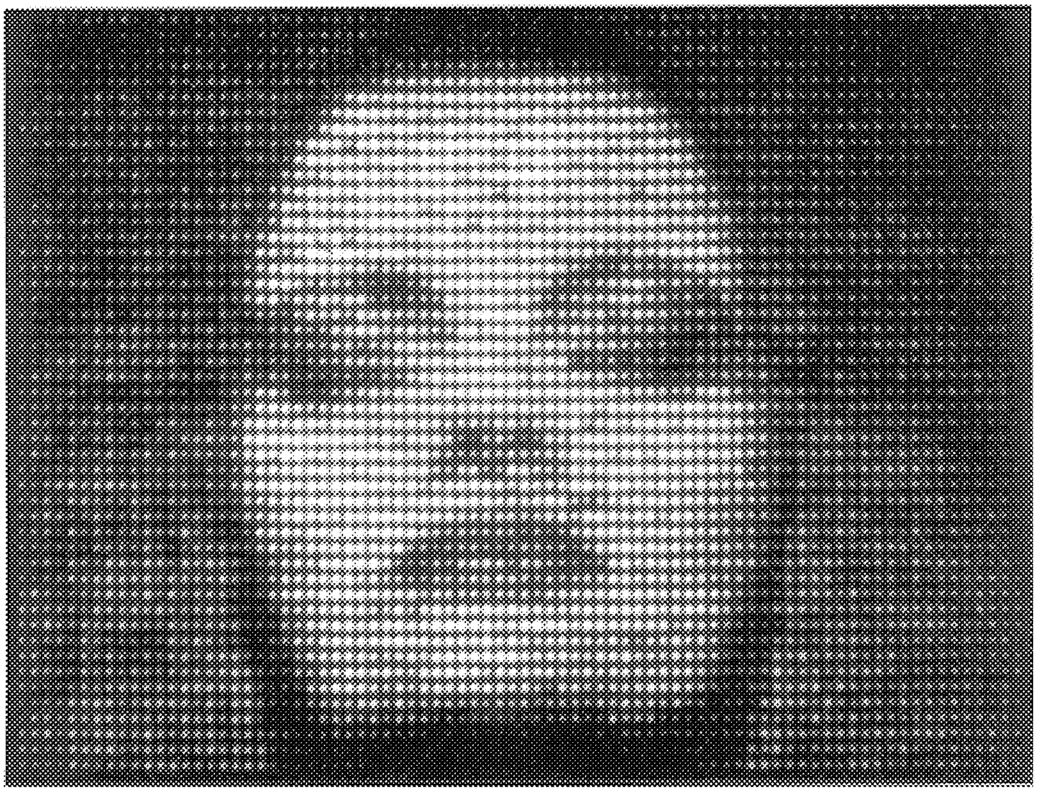
FIG. 2 is a frontal view of a display image formed in front of a display screen of the present invention.

In operation, these interconnections allow display system 10 to transmit a source image part by part or picture element by picture element from input matrix 34 to display matrix 22 of display screen 12. The light image focused on input matrix 34 emanates from the display matrix 22 to form expanded display image 31 having a different aspect size but resembling the structure of the source image provided to input matrix 34. An image generated from a source such as projector 40 can thereby be displayed in magnified form by display system 10 on display screen 12. FIG. 2 is a photograph showing a display image 31 on a 4.6 m×6.1 m display screen from a distance of 30.5 m. The source image corresponding to the display image 31 shown in FIG. 1A was generated by a film-type projector.

Figure 3A:
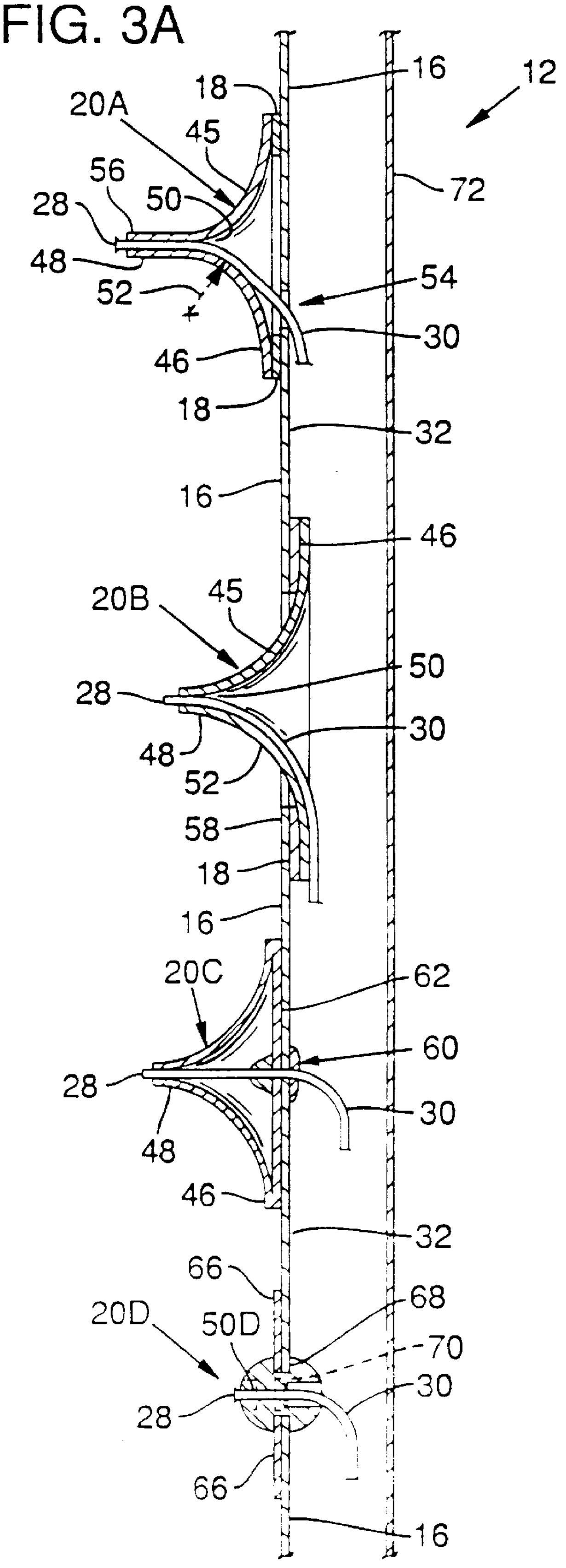
FIG. 3A is a fragmentary cross-sectional view showing four alternative embodiments of terminal housings affixed to a common substrate of a display screen of the present invention.
Figure 3D:
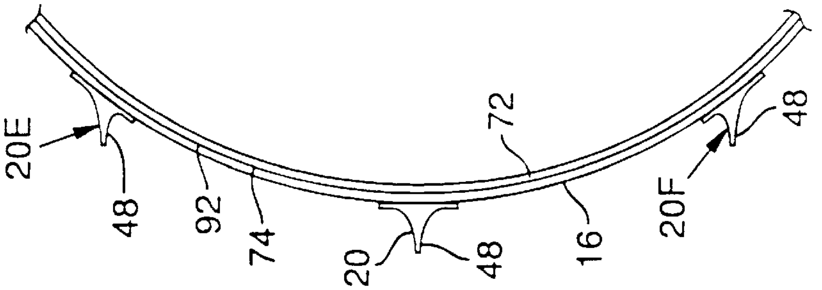
FIG. 3D is a fragmentary side elevation view showing output terminals whose necks have orientations that compensate for a curved display screen.
Figure 3C:
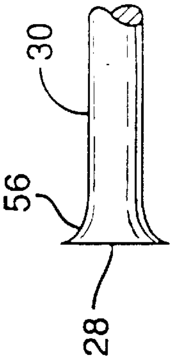
FIG. 3C is an enlarged, fragmentary view of a flared embodiment of output terminals shown in FIG. 3A.
Figure 3B:
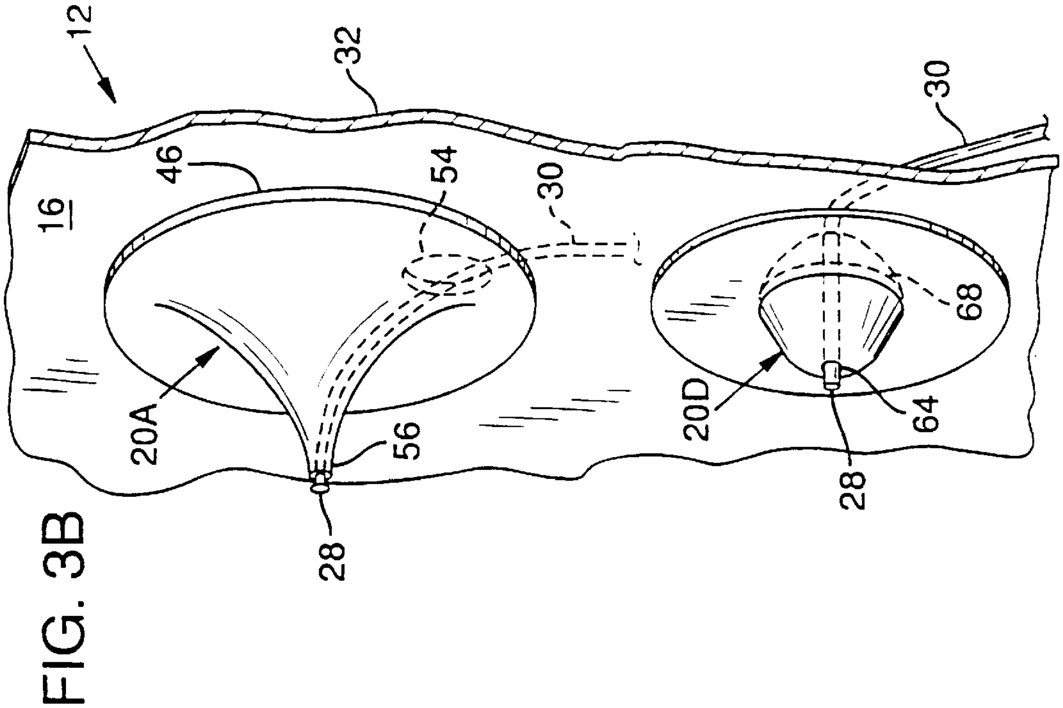
FIG. 3B is an enlarged isometric view of two of the terminal housings shown in FIG. 3A.

FIGS. 3A–3D show preferred embodiments of terminal housings 20A–20D (collectively housing 20) and preferred methods for connecting them to substrate 16 and optical conductors 30. With reference to FIGS. 3A and 3B, terminal housings 20A–20C are funnel-shaped pieces of lightweight plastic such as ABS. The funnel shape is generally right conical with a concave taper. Terminal housings 20A–20C preferably include a flared funnel portion 45 terminating in a 25–40 mm diameter terminal base 46, and a tubular neck portion 48 having a channel 50 of 0.75–1.0 mm inner diameter to receive optical conductor 30. The diameter of channel 50 preferably matches the diameter of optical conductor 30 for a snug fit.

Terminal housings 20 are preferably as lightweight as possible but sufficiently strong and durable to maintain directional accuracy of output terminals 28 and endure environmental forces such as icing or severe wind. Material thickness throughout a terminal housing 20 may vary, being thinner in areas experiencing tension and compression and thicker in areas experiencing shearing forces. Such a material thickness profile can be produced by heating a plastic disc until it is soft and pushing through the softened disc a blunt-ended probe having the same diameter as that of optical conductor 30. Metal probes such as drill blanks are preferred to prevent deflection during manufacture.

Terminal housings 20 are preferably attached to substrate 16 with adhesive layers 18. Both the terminal housing material and the substrate surface preferably exhibit relatively high surface energies for promoting uniform adhesive flow across the bonded surfaces and enhancing adhesive performance and bond strength. ABS plastic has a fairly high surface energy. A preferred adhesive system employs ring-shaped pieces of double-sided adhesive tape such as VHB, manufactured by the 3M Corporation, which tape has an acrylic-based adhesive affixed to both sides of a thin foam substrate.

A curve radius 52 determines the amount of flare of funnel portion 45 from channel 50 of neck portion 48 to base 46. The length of curve radius 52 depends on the type of optical conductor 30 employed and is approximately 10 times the diameter of the preferred optical conductor 30 previously described. Curvature of funnel portion 45 resulting from curve radius 52 prevents optical conductors 30 from kinking or exceeding a critical bend radius that seriously compromises optical performance of optical conductors 30.

In addition to providing the bend radius limiting feature, terminal housings 20 provide a means for anchoring output terminals 28 of optical conductors 30 at desired locations on substrate 16 of display screen 12 and provide a means for orienting the optical output of each output terminal 28 along a desired viewing axis.

With reference to terminal housing 20A shown in FIGS. 3A–3C, optical conductors 30 are run along rear surface 32 of substrate 16 and passed through small holes 54 formed in substrate 16 at the desired locations in display matrix 22. Optical conductors 30 pass through bases 46, run along curve radii 52, pass through channels 50, and preferably extend about 1–6 mm beyond neck portions 48. Channels 50 guide optical conductors 30 and is orient output terminals 28 toward a desired viewing angle. Optical conductors 30 are either cemented in place or mechanically fixed by thermally flaring each output terminal 28 to form a slight flange 56, as shown in FIG. 3C, to prevent output terminals 28 from slipping back through necks 48 of terminal housings 20.

Terminal housing 20B presents a preferred embodiment of a rear mounting technique for supporting output terminals 28 on substrate 16 of display screen 12. Terminal housing 20B has a larger diameter base 46 whose front or upper surface is affixed via adhesive layer 18 to the rear surface 32 of substrate 16. Neck portion 48 of terminal housing 20B protrudes through a larger hole 58 in substrate 16. Although adhesive layers tend to strengthen the integrity of some substrates 16, larger holes tend to weaken fabrics more than smaller holes because more threads in the knit are cut. The rear mounting technique may, however, be advantageous whenever display screen 12 is fitted against a rigid surface in an area subject to unusually high environmental forces.

With reference to terminal housing 20C, adhesive layer 18 can be augmented or eliminated by employing a set of small, lightweight fasteners 60 and rigid panels 62 to secure terminal housings 20C very effectively to substrate 16. It will be appreciated that a variety of lightweight and durable fastening techniques such as thermal or ultrasonic "welding" can be carried out without departing from the scope of the present invention.

With reference to terminal housing 20D shown in FIGS. 3A and 3B, "off the shelf" components may be employed to fasten output terminals 28 to substrate 16 of display screen 12. Terminal housing 20D is an elastomeric grommet or bumper having a punched or drilled channel 64 of the same or slightly less diameter than optical conductor 30. Washer 66 is sized to fit tightly into an annular groove 68 of terminal housing 20D. Substrate 16 has a hole 70 similarly sized to groove 68 such that substrate 16 around hole 70 fits snugly into groove 68 and is trapped between washer 66 and terminal housing 20D, further enhancing its security. An advantage of this embodiment is the availability of components in large quantities; and, with the exception of creating channel 64, no custom manufacturing is required.

A flexible protective cover 72, positioned coplanar but separated from rear surface 32 of substrate 16 by a small distance greater than curve radius 52, cooperates with terminal housings 20D to prevent excessive bending and kinking of optical conductors 30. Optical conductors 30 are preferably supported by or fixed to protective cover 72 to reduce vertical loading. Protective cover 72 may, for example, be a lightweight nylon netting to which conductors 30 are tied. A netting mesh facilitates access to the back of display screen 12, thereby eliminating the need to remove protective cover 72 for repairs. Soft, pliable, and durable netting having mesh openings of about 25 $mm^2$ that are sufficiently large to provide access for repairs is preferred. For some applications, stiffer and more stable polypropylene netting may be employed. Alternatively, lightweight rip stop type nylon fabrics are also suitable for use as protective cover 72. Such fabrics offer complete protection for optical conductors 30 but provide limited access for repairs.

Protective cover 72 is preferably attached to rear surface 32 around periphery 76 (FIG. 4A) of substrate 16 by stitching, adhesive, or numerous small ties. Small ties are preferred with netting, and adhesive is preferred with fabric. Persons skilled in the art will appreciate that protective cover 72 may be employed with any type of terminal housings 20A–20D to protect optical conductors 30 from damage and snagging and to protect any surface 74 (FIG. 3D) on which the display screen 12 is wrapped from damage by optical conductors 30.

With reference to FIG. 3D, whenever the viewing axis for certain output terminals 28 is not 90° from the surface of display screen 12 such as whenever it is wrapped onto a curved or nonplanar surface 74, neck portions 48 of terminal housings 20E and 20F are constructed so that they orient output terminals 28 to compensate for the curvature of the surface 74. Output terminals 28 are oriented at an equal but opposite angular displacement to the curvature of the surface 74 to provide a cohesive and substantially uniformly bright expanded display image 31 for viewing by a distant observer.

A person skilled in the art will appreciate that display screen 12 preferably employs only one type of terminal housing 28 to simplify manufacture, but any particular display screen 12 may employ a variety of types of terminal housings 28 particularly suited to the intended use and location of display system 10.

Figure 4A:
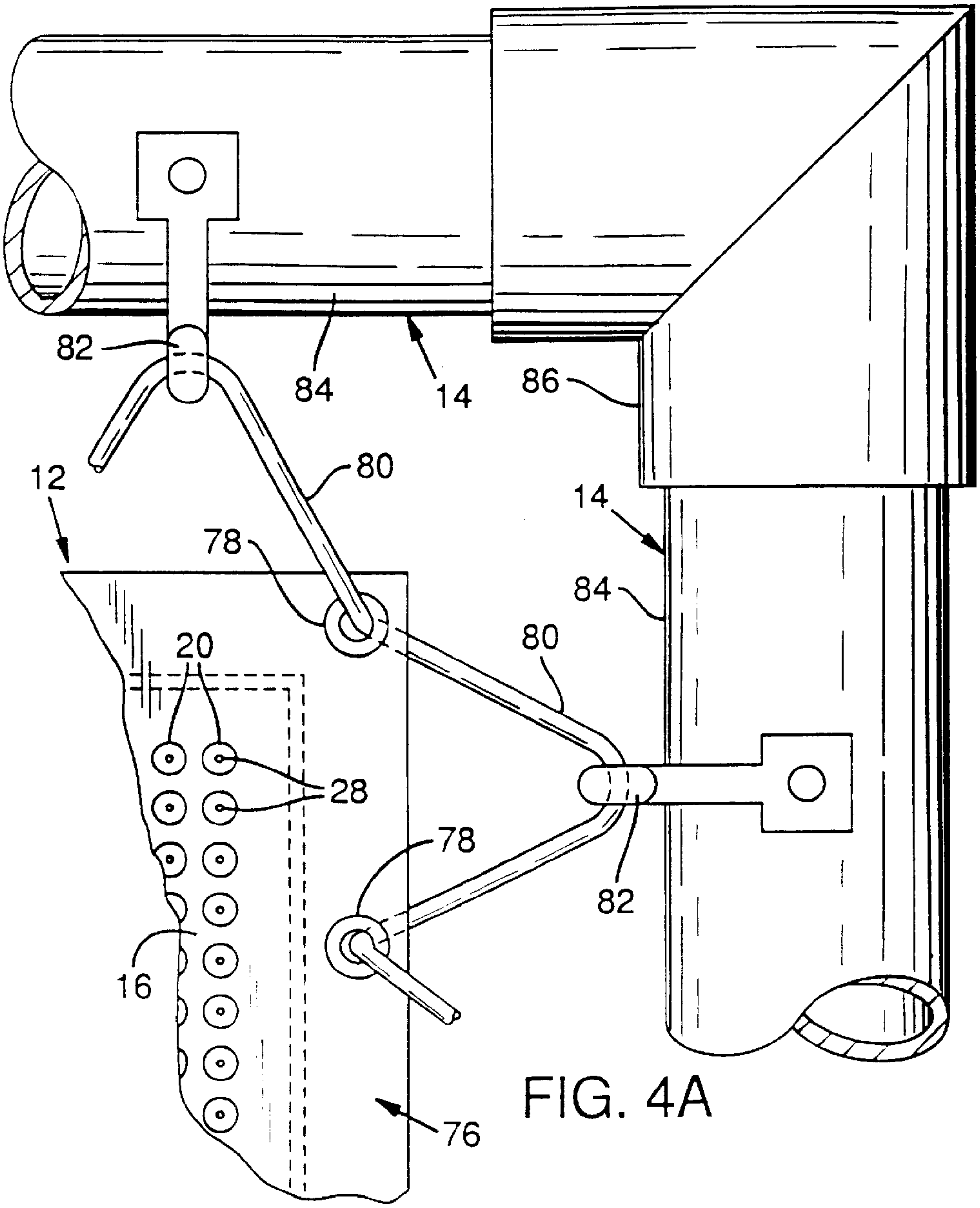
FIGS. 4A and 4B are respective fragmentary frontal elevation and sectional plan views showing an embodiment for connecting the display screen to a rigid support framework.
Figure 4B:
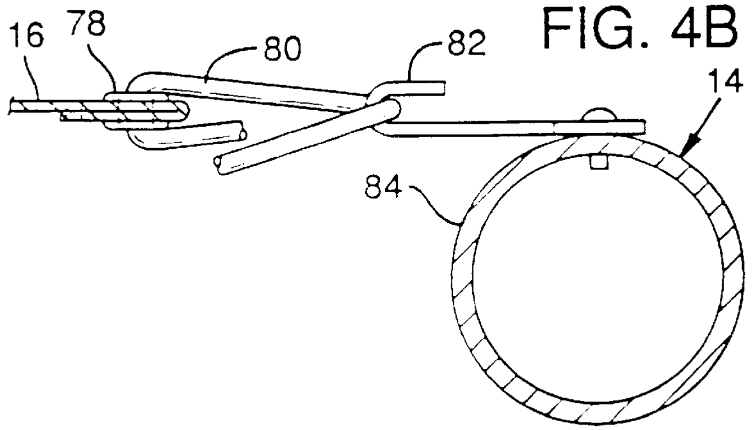

FIGS. 4A–4E show several alternate embodiments for connecting display screen 12 to framework 14. With reference to FIGS. 4A and 4B, framework 14 is composed of lightweight yet strong 80 mm diameter aluminum tubes 84 joined at their ends by removable corner connectors 86 so that the framework 14 can easily be broken down into individual components for convenient transportation. Display screen 12 may contain grommets 78 spaced at regular intervals of 150–300 mm around periphery 76 of substrate 16 to facilitate connection to framework 14. Elastic shock or "bungee" cord is preferably laced through grommets 78 and through framework hooks 82 that are attached to aluminum tubes 84 at regular intervals that equal the grommet intervals but are offset by a half interval from them.

The combination of grommets 78, cord 80, and framework 14 provides a method for holding substrate 16 of display screen 12 taught and wrinkle free. Ideally, substrate 16 is tensioned to a maximum amount, precluding damage to display screen 12 components and minimizing local surface deflection around each terminal housing 20. Such deflection is typically caused by torsional forces generated by the weight of optical conductors 30 exiting through bases 46, creating a net vertical axial load component that is translated through curve radius 52 of the terminal housing 20.

Figure 4C:
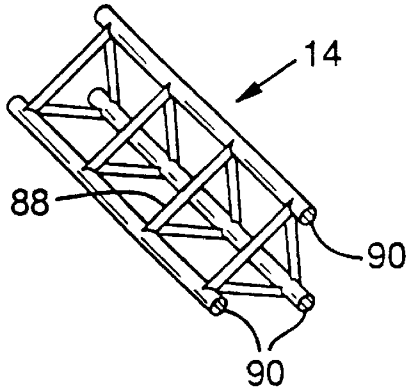
FIG. 4C is an isometric view of a portion of an alternative triangular truss-type of framework.
Figure 4D:
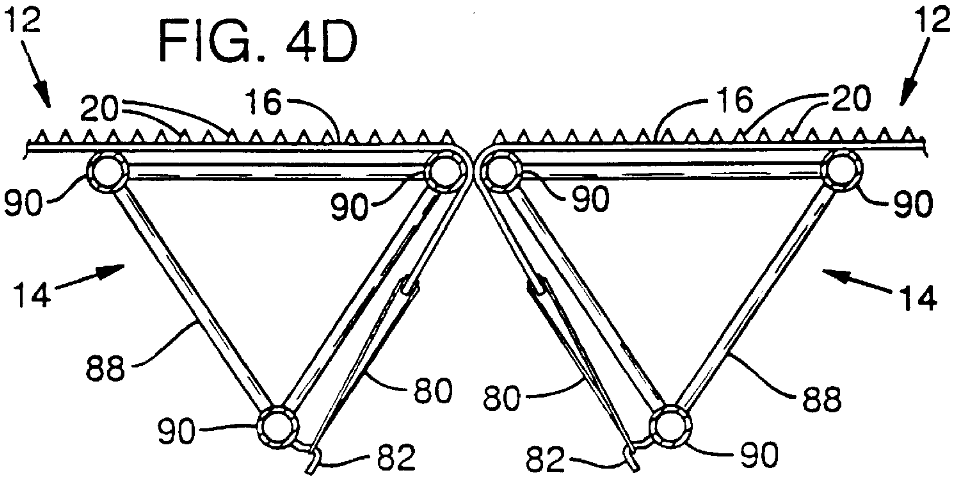
FIG. 4D is a fragmentary sectional plan view of two side-by-side triangular truss-type frameworks, showing the continuity of two adjacent display screens.

FIG. 4C depicts an alternative embodiment of framework 14, employing an easy-to-dismantle triangular truss frame 88. Truss frame 88 includes multiple poles 90 that provide numerous points for attachment of substrate 16 and facilitate the wrapping of substrate 16 around truss frame 88. Thus, output terminals 28 of display matrix 22 may cover portions of substrate 16 that overlap truss frame 88. With reference to FIG. 4D, display screens 12 of this type may be placed side by side to produce larger or longer display images 31, or a simultaneous series of display images 31, having no spacings discernable to distant observers.

Figure 4E:
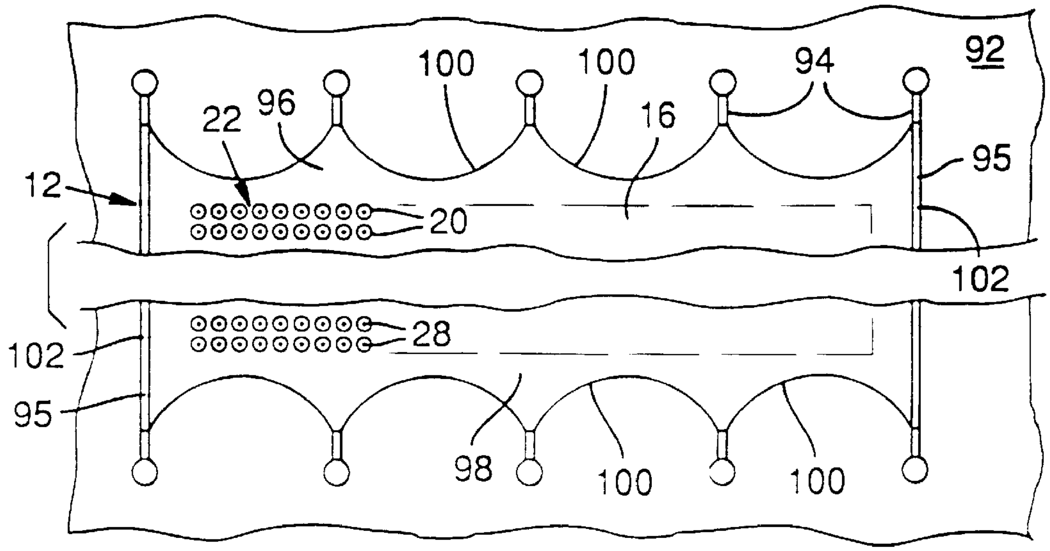
FIG. 4E is a fragmentary frontal view of an embodiment of the display screen attached to a curved surface of an airship.

With reference to FIG. 4E, whenever display screen 12 is attached to an outer gas envelope surface 92 of a non-rigid type airship such as a blimp, a rigid framework is unnecessary. Display screen 12 can be adequately tensioned directly onto surface 92 of the airship. A series of 25.5 mm wide straps 94 made from nylon filament are attached at 1.3 m intervals across top 96 and bottom 98 of substrate 12. The embodiment of display screen 12 shown in FIG. 4E measures approximately 7.5 m vertically and 6.1 m horizontally. Catenary type curves are incorporated into top and bottom edges 100 of substrate 16 to distribute more evenly the various loads applied to it. Left and right edges 102 of substrate 16 are held in place on airship surface 92 by 50 mm loop hook and fastening tapes 95 such as velcro, extending continuously along edges 102 from top 96 to bottom 98 of substrate 16.

It will be appreciated that display system 10 is ideally suited for mounting on lighter-than-air crafts because weight of display system 12 is kept to a minimum. Unit volume for unit volume, an all-plastic optical conductor is approximately six times less dense than the copper metal used in typical electrical conductors for electric signage. Furthermore, whereas four electrical conductors are generally required for each full color electrical picture element and two electrical connectors are required for each monochrome picture element, only one optical conductor 30 is used for each picture element in display system 10, thereby substantially reducing its weight. Display screen 12 described in connection with FIG. 4E has approximately 3700 optical conductors and weighs about 45 Kg, and it requires neither the bulk nor the weight of a framework for supporting a conventional display system. For operations of display system 10 in which framework 14 is not employed, projector 40 is preferably supported in a manner that ensures that excessive strain is not placed on optical conductors 30 leading into input matrix 34.

It will also be appreciated that flexible substrate 16 and highly flexible optical conductors 30 permit display screen 12, such as one the size of that described in connection with FIG. 4E, to be easily folded into a 1 m×1.5 m×0.5 m volume, thereby greatly enhancing transport of display system 10. One skilled in the art will also appreciate that display system 10 of the present invention may be employed at many ground-based or suspended site locations that preclude the weight or framework bulk of conventional display systems.

Figure 5:
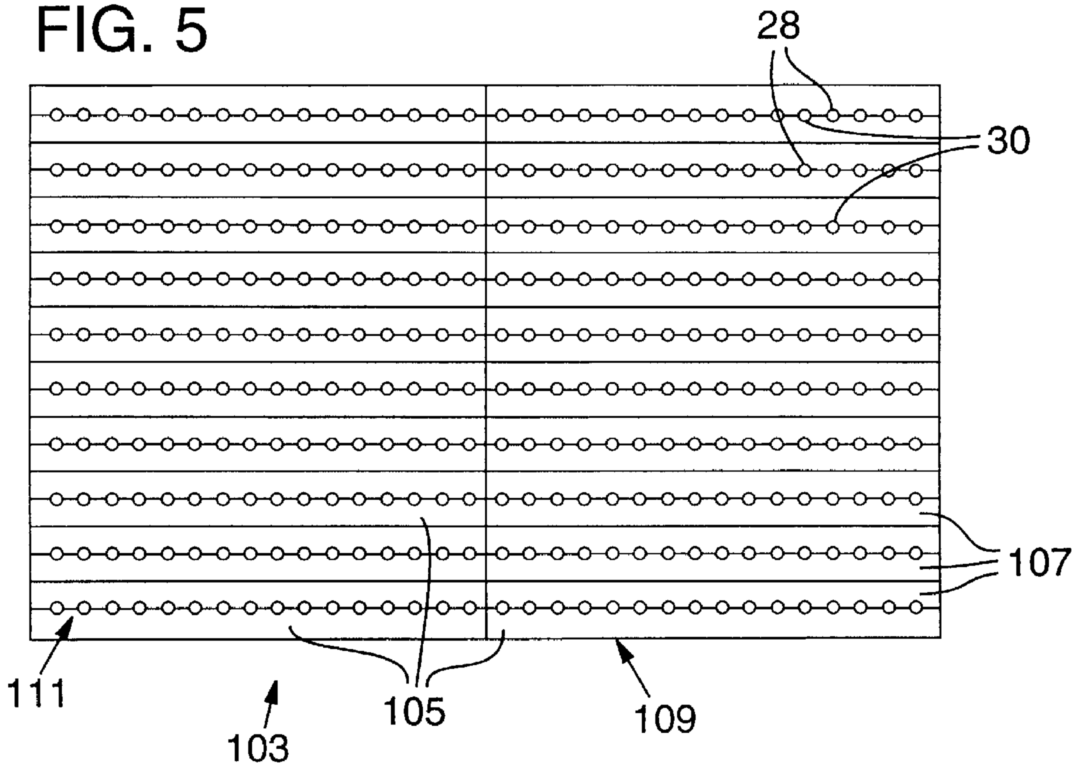
FIG. 5 is a front elevation view of an alternative display screen constructed of rows of resilient output blocks.

FIG. 5 is a front elevation view of an alternative display screen 103 constructed of rows of output blocks 105. Blocks 105 preferably include opposing strips 107 of a preferably resilient material such as foam that cooperate to form a support surface that secures optical conductors 30 in a predetermined spaced-apart display matrix 109. The output terminals 28 of optical conductors 30 may be flush with or protrude from front surfaces 111 of blocks 105. Skilled persons will appreciate that blocks 105 may encompass an entire row or only a small portion of a multi-block row. Alternatively, blocks 105 may be arranged in columns or in an off-axis arrangement provided that the relative arrangement of output terminals 28 corresponds to the relative arrangement of input terminals 36. This alternative display screen 103 and matrix 109 can be employed with a number of the fiber-optic display system components hereinafter disclosed. Display screen 103 and variations thereof are described in U.S. Pat. No. 4,839,635 of Harris et al., issued Jun. 3, 1989, which is herein incorporated by reference.

Figure 5A:
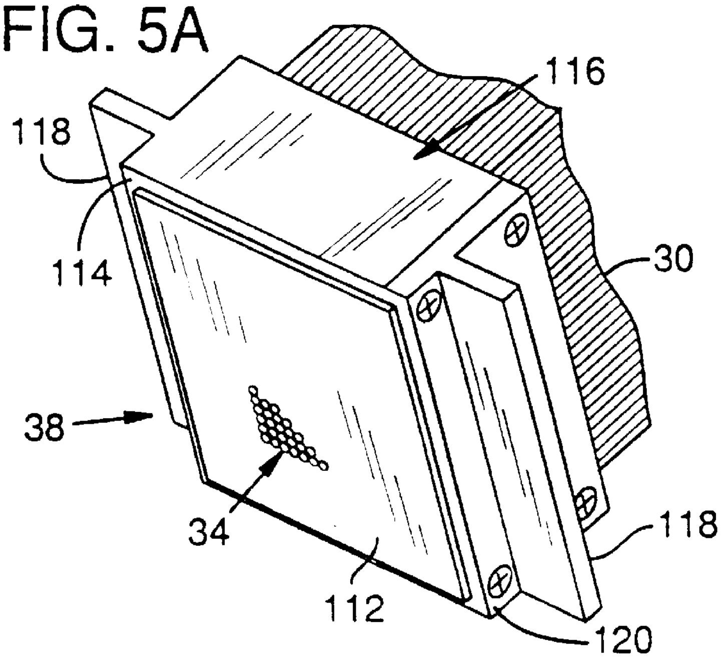
FIG. 5A is an isometric view of a launch grid for maintaining the integrity of an input matrix.

FIG. 5A presents an isometric view of a preferred embodiment of launch grid 38, which serves as a common collection point for optical conductors 30. Launch grid 38 functions to maintain the proper arrangement of input terminals 36 forming input matrix 34, offers an optimal optical protective surface 112 for input matrix 34, provides for mechanical attachment to projector 40, and functions to dissipate heat generated by the concentrated optical radiation directed against input matrix 34.

Launch grid 38 preferably includes a 12.7 mm thick, 51 mm wide body 114 of "U"-shaped cross section, forming three of four sides of clamp 116. Body 114 preferably includes two flanges 118 for securing launch grid 38 onto projector 40 and may be milled from a single block or assembled from independent pieces of appropriately dimensioned bar stock by welding or securing with threaded fasteners. A closure piece 120 forms the fourth side and closes the "U" of clamp 116, thereby fully surrounding about the last 6 mm of optical conductors 30 feeding into input matrix 34.

Figure 5B:
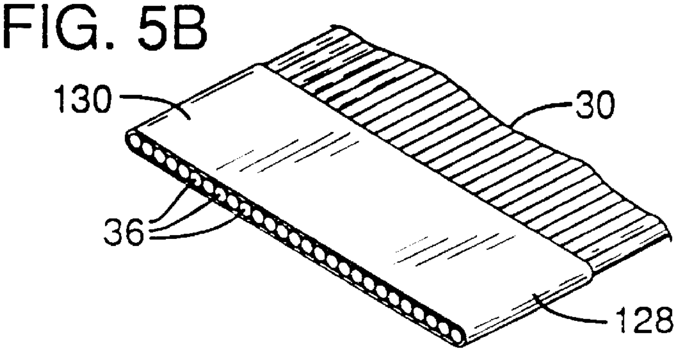
FIG. 5B is a fragmentary isometric view of an input matrix ribbon comprising a row or column of input terminals wrapped in a strip of heat-conductive tape.
Figure 5C:
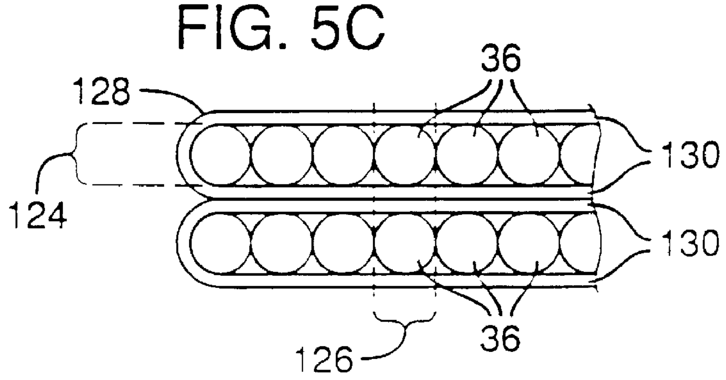
FIG. 5C is an enlarged, fragmentary frontal view of two adjacent input matrix ribbons showing an asymmetry between rows and columns of the input matrix caused by the strip of heat-conductive tape.

With reference to FIGS. 5B and 5C, the arrangement of input terminals 36 in input matrix 34 exactly duplicates the arrangement of output terminals 28 in display matrix 22. Preferably, input terminals 36 of optical conductors 30 are first gathered into individual rows 124 or columns 126 to form short 51–155 mm ribbons 128. Ribbons 128 typically include an entire row or column of adjacent and contacting input terminals fixed into position by a single layer of heat conductive tape 130. Such heat-conductive tape 130 may be, for example, 0.075–0.125 mm thick, 50 mm wide strips of adhesive-backed aluminum foil. Thicker tapes can be employed but could increase the intersticial gaps between the assembled row or column ribbons 128 and might create optical losses as well as unacceptable geometric distortion.

Persons skilled in the art will appreciate that great care is taken to maintain a constant aspect ratio between input matrix 34 in launch grid 38 and display matrix 22 on display screen 12. Heat-conductive tape 130 imposes an asymmetry in input matrix 34 such that the spacing of input terminals 36 along one axis is slightly greater than along the other. Accordingly, the spacing of output terminals 28 of display matrix 22 compensates for any geometric distortion on display image 31 induced by the thickness of tape 130 on the spacing of rows 124 or columns 126 in input matrix 34 within launch grid 38.

As ribbons 128 of rows 124 or columns 126 are stacked into launch grid 38, they are sequentially cemented to each other with a slightly thick cyano-acrylate adhesive to conform to shallow groove-like depressions formed in tape 130 of ribbons 128. The adhesive is also applied to the outer sides of the first and last ribbons 128 to facilitate attachment to pieces 114 and 120, respectively, of clamp 116.

Ribbons 128 are positioned so that input terminals 36 extend about 6.5 mm beyond the edge of clamp 116 to facilitate polishing for maximizing optical efficiency. Preferably, the extended portions of optical conductors 30 are collectively ground with a coarse grinding disc until they are within 2.6 mm of clamp 116 to create input terminals 36. Input terminals 36 are then collectively sanded with progressively finer sanding media until they are flush with clamp 116. A flat block is employed to support the sanding media to ensure that input matrix 34 has a uniform, flat surface. Typically, three stages of finishing suffice, ending with 320 grit sanding media.

Input terminals 36 are washed with a mild detergent and water to remove any debris left by the sanding process and then wiped with toluene solvent to prepare input matrix 34 for bonding with protective surface 112. Protective surface 112 may be, for example, a 1.6–3.2 mm thick cover glass that provides a durable, flat, and easily cleanable surface. Protective surface 112 preferably extends beyond the edges of input matrix 34 and onto clamp 116 of launch grid 38 and is bonded with a thin uniform adhesive layer, free of air bubbles and debris. The adhesive is also preferably transparent to the entire visible spectrum and should have an index of refraction upon curing that is substantially equal to protective surface 112 and the cores of optical conductors 30. A preferred adhesive is Epo-tec 301, a two-part epoxy-type adhesive designed for optical applications supplied by Epoxy Technology Corp.

Figure 6C:
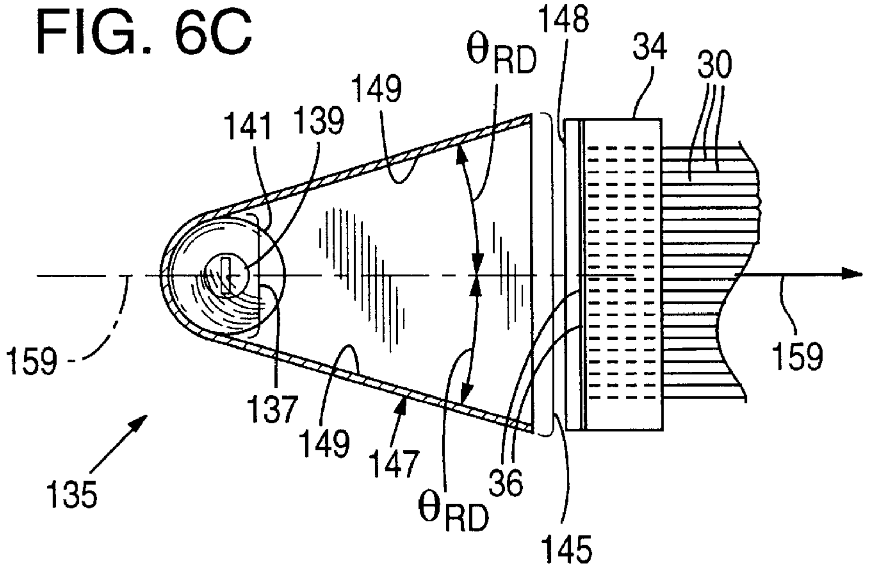
FIG. 6C is a plan view of a preferred reflector assembly employed within the projector.
Figure 6A:
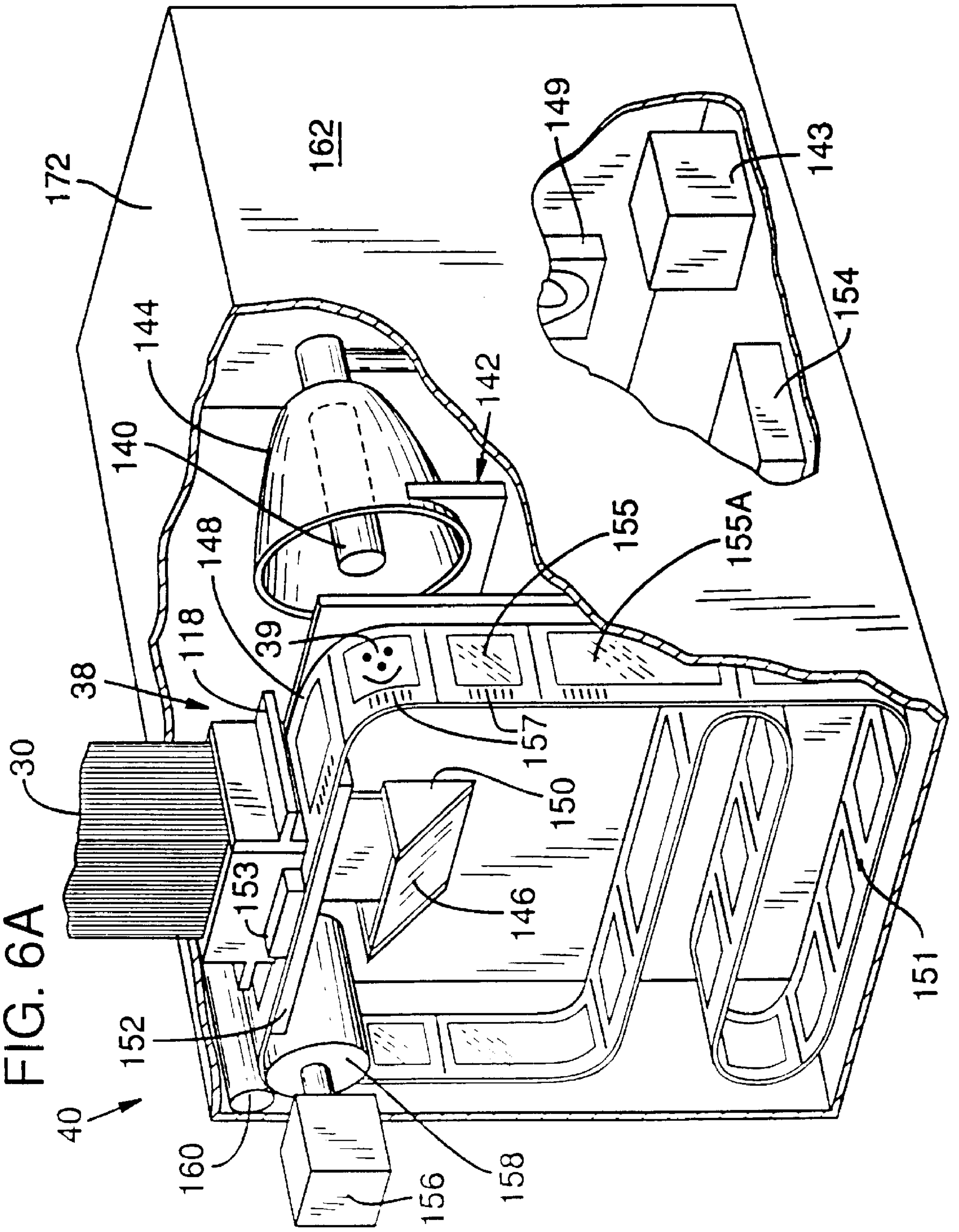
FIG. 6A is an isometric view of an embodiment of a projector with portions broken away to show certain of the projector components.

FIG. 6A depicts a typical projector 40 of the present invention and preferably includes a high efficiency, tubular, metal halide, high intensity discharge (H.I.D.) lamp 140 mounted on support brackets 142 within projector 40 for projecting a source image 39 onto input matrix 34 (FIG. 5A). Lamp 140 is electrically connected to transformer 143 that may convey power from a standard or high power electrical outlet. Such a lamp 140 has the advantages of producing a very white color, desirable for accurate color rendition; being over five times more efficient at converting electrical energy into visible light than incandescent lamps; being easier to optimally position into a reflector than standard bulb forms; and having a long service life, in excess of 9000 hours. In addition, the optical energy produced by this lamp has markedly less infrared wavelengths than incandescent types and, therefore, is easier to cool and has less potential for thermally damaging the imaging media or optical conductors 30, especially when concentrated. Power requirements for lamp 140 typically range from 250–1500 watts depending on the required display visual performance.

A half ellipsoid-shaped reflector 144 is mounted around lamp 140 such that it is positioned coaxially with the major axis of reflector 142 and centered at its elliptical focal point. Reflector 144 is preferably 200 mm in diameter and 150 mm deep and serves to efficiently collect, concentrate, and direct the optical energy of the lamp 140 toward mirror 146, positioned approximately 380 mm from the elliptical focal point or imaging media 148.

FIG. 6C is a plan view of an alternative, and most preferred, reflector assembly 135 that includes an input aperture 137 for receiving the light from light-emitting element 139 of light source 141 and a larger output aperture 145 through which the light exists reflector assembly 135. The light impinges on imaging medium 148 and is transferred to the input terminals 36 of the input matrix 34. A reflector head 147 having at least one pair of reflective surface sections 149 is positioned between input aperture 137 and output aperture 145 to direct reflected light toward imaging medium 148. Bisecting axis 159 bisects reflector head 147 such that surface sections 149 diverge from axis 159 within about 15% of an angle $\theta_{RD}$, where $$\Theta_{RD} = \frac{2\sin^{-1}\sqrt{(n_1^2 - n_2^2)}}{4};$$

where $n_1$ is the refractive index of the core of optical conductors 30 and $n_2$ is the refractive index of the cladding of optical conductors 30. This reflector assembly 135 and variations thereof are described in U.S. Pat. No. 5,428,365 of Harris et al., issued Jun. 27, 1995, which is herein incorporated by reference.

It will be appreciated that other types of lamps 140 and reflectors 144 may alternatively be employed, such as an elliptical trough-type reflector cooperating with a lamp placed transversely across the reflector at its focal point, or a conically (15°–30° slope) focusing-type reflector cooperating with an auxiliary back reflector to reflect light toward a small area.

Preferably, a wavelength selective mirror 146 is interposed between lamp 140 and imaging medium 148 by a mirror support bracket 150. Mirror 146 reflects only the visible portion of the emitted light toward imaging medium 148, positioned proximal to protective surface 112 and input matrix 34, and passes the infrared portion of the emitted light so that it does not reach input matrix 34, thereby substantially decreasing the heat directed at imaging medium 148 and input matrix 34. Projector 40 uses fan 149 to augment the dissipation of heat generated by the various projection and imaging components. Cooling air is particularly directed over imaging medium 148 to dissipate heat caused by remaining infrared or other optical energy present in light emitted from lamp 140.

With reference to the embodiment of projector 40 shown in FIG. 6A, source images 39 are formed on imaging medium 148 that may be, for example, a series of photographic positive image transparencies 155 assembled into a continuous, closed film loop 151. The size of each such source image 39 is typically essentially the same as the size of input matrix 34. Each film transparency 155 containing a source image 39 is sequentially positioned in registration with input matrix 34 on transparent holding plate 152 and is held stationary for a desired length of time. Holding plate 152 is preferably 3.2–6.5 mm thick, tempered glass held in place by aluminum brackets. Holding plate 152 holds the film transparency 155 against the protective surface 112, but provides a 1.3–2.5 mm gap to allow imaging medium 148 to slip between the two surfaces without binding.

Projector 40 employs a metallic brush-like sensor or an optical sensor 153 to detect metallic or serial bar registration codes 157 affixed to or printed on a 13 mm margin of the transparencies 155 to facilitate the sequencing and registration process. Optical bar codes 157 are more versatile and may encode, for example, the stop time duration for the currently displayed transparency 155 and the speed of transition to the next transparency 155, as well as provide registration information. A sensor 153 reads code 157 and produces a sequence of on and off electrical signals unique to each transparency 155. The signals are sent to a motor control processor 154 that controls a driving motor 156 and generates any other information and/or control sequences as necessary.

Preferably, for simple sequential operations employing a single display screen 12 to project individual transparencies 155 with constant dwell and transition times, a permanent magnet-type driving motor 156 is employed in concert with a drive roller 158 and a pinching roller 160 to move film loop 151 from transparency 155 to transparency 155. However, for applications where multiple display screens 12 are employed and source images 39 are synchronized and/or have variable transition rates, stepping-type motors driven by dedicated stepping motor controllers pulsed with a common clock signal are preferred.

A variable transition rate may be desirable for transparencies 155A that are longer than the length of input matrix 34 and that preferably pass it at a constant speed which is slower than a single frame transition rate, resulting in a "scrolling" effect such that display image 31 moves across display screen 12. Long film loops 151 are "folded" into a space provided within a projector housing 162, and the transparency material is sufficiently stiff to prevent undesirable creasing.

Figure 6B:
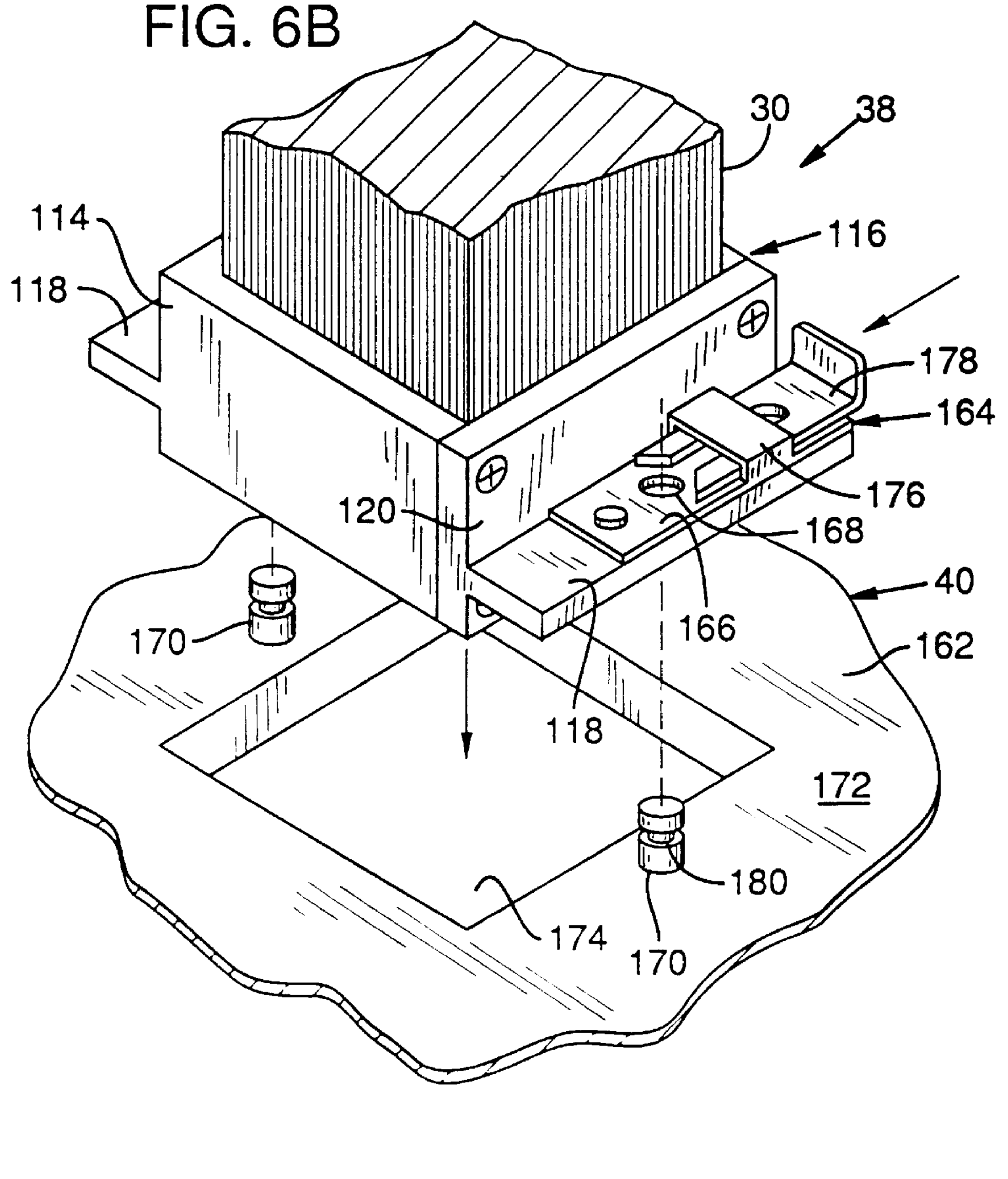
FIG. 6B is an enlarged, fragmentary isometric view showing an embodiment for removably attaching a launch grid to a projector.

With reference to FIG. 6B, launch grid 38 may be removably attached to projector 40. Each flange 118 of clamp 116 is equipped with a fastening clip 164 having a plate 166 that contains a hole 168 adapted to receive a fastening pin 170. Fastening pins 170 are attached to top 172 of projector housing 162 and positioned on either side of an aperture 174 adapted to receive clamp 116 of launch grid 38. Plate 166 provides a brace 176 for anchoring a securing clip 178 that is adapted to slide along plate 166 and engage groove 180 in fastening pin 170.

Figure 7A:
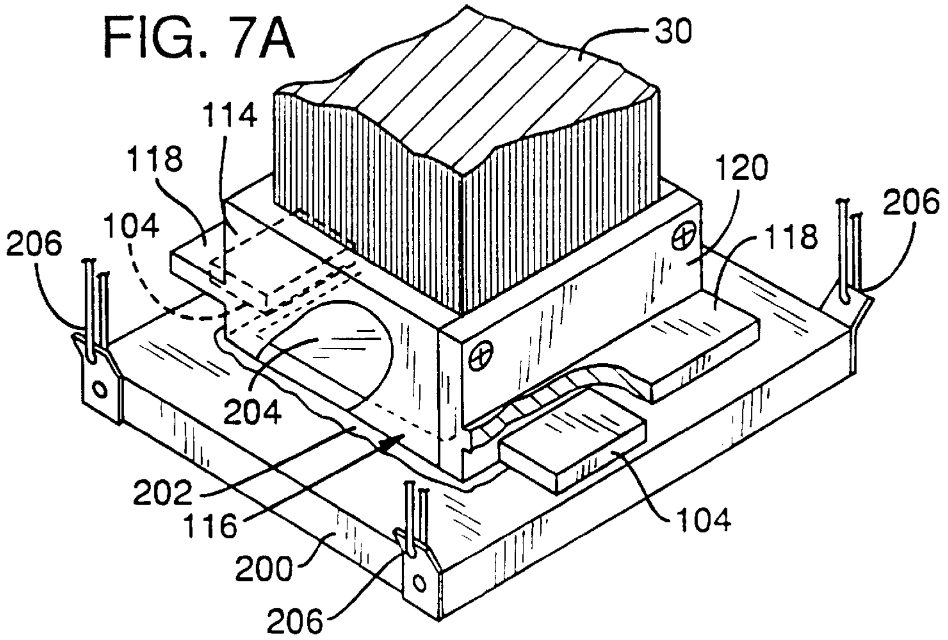
FIGS. 7A and 7B are enlarged, fragmentary isometric views showing, respectively, an embodiment for permanently affixing a launch grid to an electronic imaging module and an alternative embodiment for removably attaching a launch grid to a projector or an electronic imaging module.
Figure 7B:
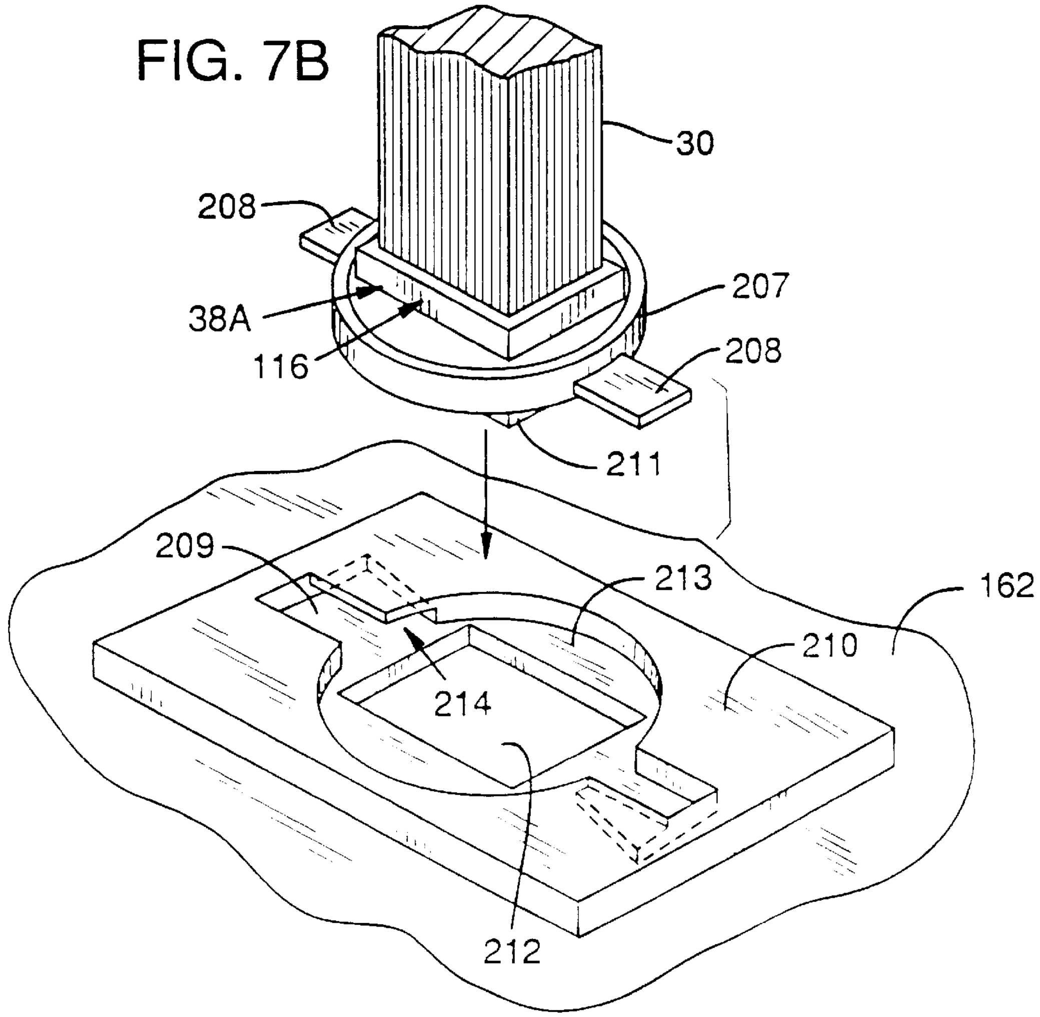

With reference to FIGS. 6A, 7A, and 7B, projector 40 may alternatively be adapted to receive an electronic imaging module 200 permanently or removably attached to launch grid 38. Electronic imaging module 200 is substituted for imaging medium 148 and associated drive and support components described in connection with projector 40, and may be, for example, a liquid crystal display (LCD) that provides either passive or active imaging means.

Passive imaging modules 200 are similar to those used in small back-lit computer displays and rely on external control circuitry that rapidly sequences through the rows and columns of the picture elements switching each individual element to a desired state of polarization which, by way of external polarizing layers, controls the opacity of the picture element. During time intervals in which particular picture elements are not being activated by the electrical signal, the picture elements assume an "off" state and their opacity returns to a nonactive condition.

Image information is preferably generated by a computer, which can store and manipulate several images, connected to a projector.

Passive imaging color schemes typically employ stacked subtractive color elements such as cyan, magenta, and yellow and utilize the entire picture element area to provide a high degree of transparency and more efficient color control. Some advantages of passive imaging modules include their relatively low cost and their relatively high optical transmittance that is significantly greater than active color imaging modules. Because the bulk of the picture elements are off or inactive at any given moment, the performance, especially the contrast, of the entire imaging module is somewhat handicapped.

Because they are subject to contrast and speed limitations, passive modules are better suited for displaying computer generated information than television-type images.

Active imaging modules are, on the other hand, conventionally employed for producing video images. In active imaging modules, transistors or diodes controlled by external circuitry are used to switch and isolate electrical states of, for example, liquid crystal picture elements so that they hold a particular state until a signal updates or refreshes their electrical states. The dielectric nature of physically and electrically isolated liquid crystal picture elements permits accumulation of switching signal charges so the picture elements can retain their relative opacity until refreshed. Accordingly, at any given time, every picture element in an active imaging module is active at a particular optical state, from transparent to fully opaque.

Active color imaging modules typically employ additive color generation schemes that include adjacent red, blue, and green liquid crystal picture elements, and may thereby limit the transmissivity of the imaging module. Preferably, interfacing control circuitry accepts a video signal, provided by video tape recorder/playback devices; video disk equipment; television cameras connected directly through switching equipment or by radio or light wave communication links; or any suitable combination of these or other video processing and signal generation devices, and drives the liquid crystal module circuitry to produce a video image. Computer generated information can also be displayed by an active imaging module after suitable translation from computer display format to video display format.

Advantages of active imaging modules include full color imaging and high quality animation capability. For example, with this type of imaging module a large television display can be produced.

A person skilled in the art will appreciate that two or more display systems 10 may cooperate to generate a very large display image employing multiple display screens 12.

Video signals are processed to produce a discrete signal for each display system used to form the display image such that each discrete signal represents a geometric section of the display image. With reference to FIG. 4D, display screens 12 are arranged to eliminate as much as possible any seams or inactive area in order to create the illusion of a large continuous display surface.

FIGS. 7A and 7B depict methods for permanently affixing or removably attaching electronic imaging module 200 to housing 162 of projector 40. With reference to FIG. 7A, imaging module 200 is preferably bonded directly against input matrix 34 in launch grid 38. Protective surface 112 is eliminated to maximize the heat sinking ability of input matrix 38 to draw optically generated heat away from imaging module 200. Preferably, an ample amount of refractive index-matching, epoxy-type adhesive 202, such as Epo-tek 301, is applied to the middle of input matrix 22 which is then slid between side stops 104 until it contacts a back stop (not shown) to facilitate registration over the imaging portion 204 of module 200.

It will be appreciated that a suitable index-matching gel such as Cargille Labs #24230 optical gel may be substituted for adhesive 202 to provide a removable method of connecting input matrix 22 to electronic imaging module 200. Elastomeric or spring extension members 206 may be employed to support imaging module 200 against a removably attached input matrix 34 within projector 40 to provide the necessary force for mating while providing sufficient resiliency to prevent possible damage to imaging module 200 from excessive or unequal stresses that may occur during coupling or uncoupling.

With reference to FIG. 7B, a removable launch grid 38A employs a quick-release "bayonet"-type fastening technique. Launch grid 38A includes a rotatable coupling member 207 that is equipped with two or more preferably flat tangs 208 for engaging insert slots 209 of a non-rotating coupling member 210 on projector housing 162. Input matrix end 211 of launch grid 38 and rotatable coupling member 207 fit snugly into an input matrix receptacle 212 and a circular receptacle 213, respectively. Rotatable coupling member 207 is then rotated so that tangs 208 slide into undercut slots 214, locking launch grid 38 into housing 162 of projector 40. Persons skilled in the art will appreciate that a variety of quick-release fastening techniques such as slide latches, quarter-turn fasteners, or clevis pins may be employed without departing from the scope of the present invention.

Although manufacturers of electronic imaging modules place a certain number of electronic components adjacent to the imaging portion, it is preferable to position the electronic components within projector housing 162 and connect them to the imaging module by electrical cable. Skilled persons will also appreciate that within imaging module 200, the polarizing layer closest to lamp 140 should preferably be positioned at a distance (15 mm to 30 mm) from the liquid crystal layer to reduce possibility of heat-caused damage or performance loss.

Projectors 40 may alternatively employ lasers in place of lamps 140 and imaging media 148. A laser may, for example, produce a light beam containing wavelengths of the primary colors, red, blue, and green and modulate their proportions to provide a full range of colors. The light beam is deflected in a desired pattern by mirrors attached to high speed galvanometer scanners. The pattern is scanned repeatedly at high speed to produce a visual illusion of a moving line rather than a moving spot. The modulators and deflectors are preferably controlled by a computer which can store and manipulate many stationary or animated graphic images.

Advantages of this type of laser projector include very bright and uniquely graphic display images 31. However, the high cost and complexity of conventional laser components, the inability to display a "filled" image, and possible flickering caused by deflection speed limitations of beam deflecting apparatuses will all diminish as advances in the laser art continue.

Another type of laser-based projector is capable of projecting video images by deflecting the light beam in a "raster" pattern similar to that seen on a television picture tube. The deflection employs a rotating polygonal mirror to provide the requisite horizonal deflection pattern and a galvanometer scanner to provide the vertical deflection. Both deflection components are synchronized electronically to the incoming video signal to produce a stable image.

Regardless of the imaging means employed, light emitted (other than laser light) from projector 40 should preferably impinge on input terminals 36 at angles that, as much as possible, subtend the full acceptance angles of optical conductors 30 to ensure the brightest possible display image 31 from a given lamp 140. Accordingly, the geometry of reflector 144 and the optical path are arranged so that the emitted light bears on input terminals 36 at the proper angles. For the preferred embodiment of optical conductor 30 previously described, the acceptance angle is about 60 degrees. Thus, the emitted light should impinge upon imaging medium 148 and through to input matrix 34 over a 60 degree angle.

Light forming a portion of display image 31 is emitted from each output terminal 28 in a projection cone that subtends an output angle that is substantially equivalent to the acceptance angle of each optical conductor 30. Accordingly, a practical viewing angle of such emitted light is confined to this output angle. The output angle and hence the practical viewing angle may be increased, however, through a variety of refractive or diffractive techniques.

For example, refractive techniques may include optical dispersion that may be implemented by thermally or mechanically "roughening" or contouring each output terminal 28 to provide a lens- or prism-like shape.

Figure 8A:
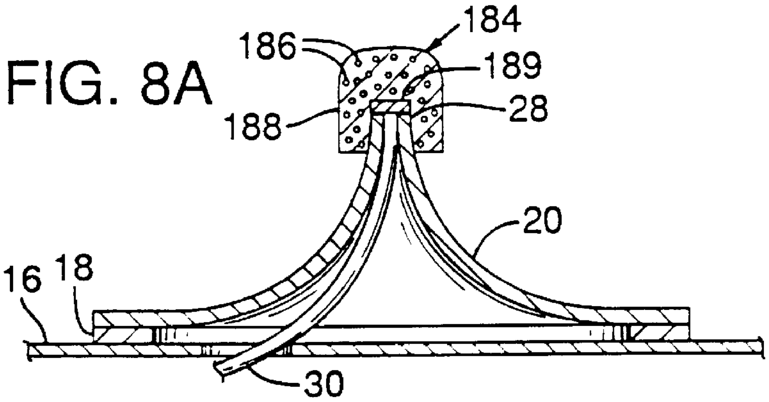
FIGS. 8A–8D show enlarged disproportionate, fragmentary, sectional views showing four alternative embodiments for increasing projection cone emittance angles from output terminals to improve the viewing axis of display screen 12.
Figure 8B:
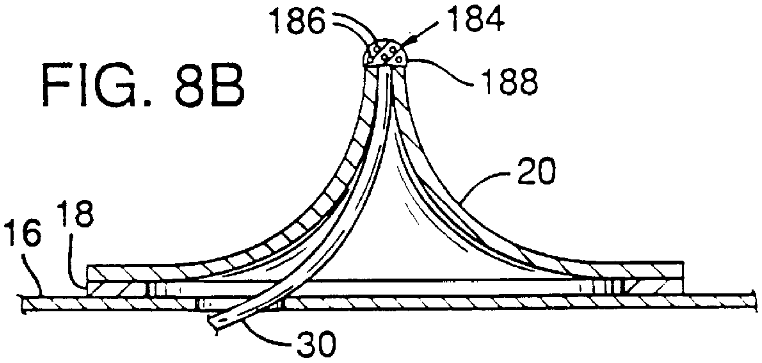

With reference to FIGS. 8A and 8B, a preferred refractive dispersion technique employs a terminal cap 184 affixed to each output terminal 28 and containing numerous 10$\mu$–30$\mu$ gas bubbles 186 (disproportionately large in FIG. 8A) dispersed throughout a denser, transparent medium 188. Preferred gas bubbles 186 are air- or methane-filled micro-balloons manufactured by 3M Corporation and are dispersed in clear acrylic, polycarbonate, or optical epoxy. The relative content of gas bubbles 186 to medium 188 determines the light dispersion characteristics of terminal cap 184. For example, a 1:2 ratio of micro-balloons to Epo-tec 301 in a 0.001 mL drop applied to an output terminal 28 yields over a 200% increase in emitted light dispersion.

FIG. 8A shows a disproportionately large injection molded embodiment of terminal cap 184 adapted to adhere to either output terminal 28 or terminal housing 20. A drop of epoxy or adhesive 189 may also be employed between terminal cap 184 and output terminal 28 to enhance security of terminal cap 184. Alternatively, FIG. 8B shows an epoxy embodiment of terminal cap 184 applied to output terminal 28 with a syringe. Surface tension pulls the liquid epoxy so that it cures into a quasi-spherical shape.

Figure 8C:
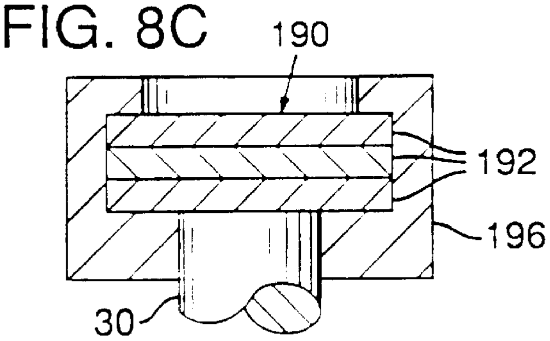
Figure 8D:
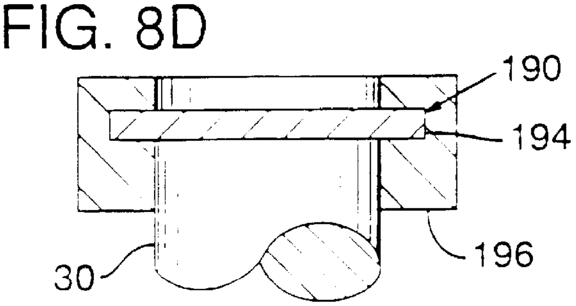

With reference to FIGS. 8C and 8D, diffractive dispersion may be implemented with a diffractive element 190 such as an optical grating or a holographic optical element. These diffractive elements typically include stacked multiple wavelength-specific layers 192 (FIG. 8C) or a superimposed wavelength-specific single layers 194 (FIG. 8D) for each primary color and are supported on each output terminal 28 by holding fixtures 196 cemented to output terminal 28 and/or terminal housings 20.

Augmented cooling is desirable for electronic imaging modules that are particularly sensitive to excess heat and is preferably implemented with an active cooling mechanism which provides a form of refrigeration to the airstream moving over the imaging medium 148.

Figure 9:
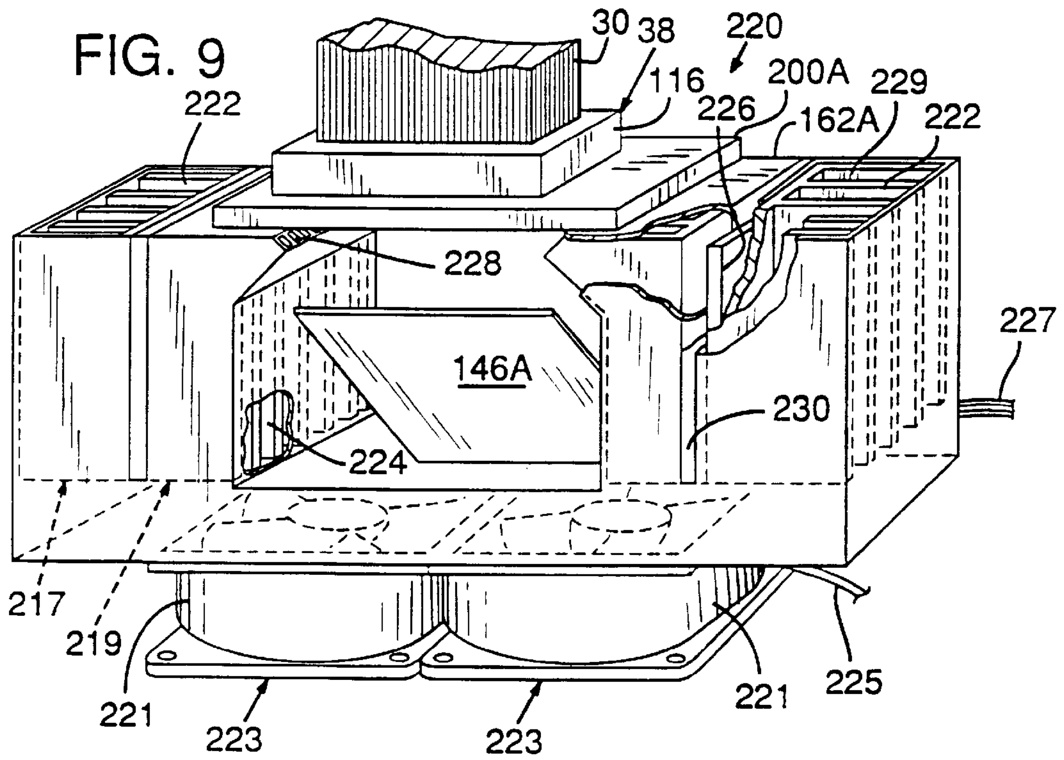
FIG. 9 is an isometric view of a heat exchanger incorporating an electronic imaging module projection system and having positions broken away to reveal heat exchange components.

FIG. 9 depicts a heat exchange system 220 with portions broken away to reveal heat exchange components for implementing a preferred method of augmenting cooling of the imaging means. Heat exchange system 220 includes a housing 162A to which an LCD electronic imaging module 200A is attached, a cold mirror 146A, and lead wires 225 and 227 for supplying power, respectively to fans 221 and thermo-electric heat exchange modules 226.

In operation, fans 221 draw air through ambient air inlets 223 and direct it over a set of respective heat and cold sinks 217 and 219 including respective heat- and cold-sinking aluminum or copper fins 222 and 224 that are cooled by several thermo-electric heat exchange modules 226. Heat exchange modules 226 exploit the Peltier effect by passing electricity through the junction created by contact of two dissimilar metals, thereby causing one metal to become cool while the other becomes warm. Air passing heat exchange modules is circulated through cold and hot air exhausts 228 and 229, respectively. Heat exchange modules 216 have no moving parts and are very reliable, and numerous 26 mm×26 mm modules 216 may be employed to produce a very cool airstream. Heat exchange system 220 also includes a thermal insulation barrier 230 to reduce thermal leakage from the heat sink 217 to cold sink 219, thereby increasing the efficiency of heat exchange system 220.

Figure 10:
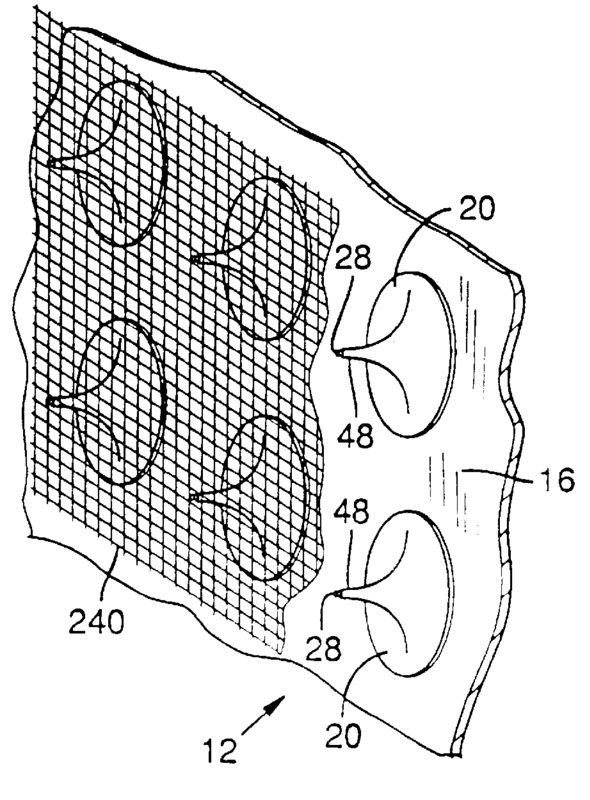
FIG. 10 is an enlarged, fragmentary isometric view of a display screen covered with a dyed or printed netting or fabric.

With reference to FIG. 10, substrate 16 of display screen 12 may also exhibit conventional painted or printed graphics. Such graphics may be affixed or applied directly to substrate 16 as long as the graphics do not occlude output terminals 28. Alternatively, the background color or graphic appearance of substrate 16 may be changed with a removable, thinly-meshed, lightweight netting 240. Netting 240 is first painted or printed with desired images, information, or background color and then laid over desired areas of substrate 16 such that neck portions 48 of terminal housings 20 extend slightly through the mesh of netting 240. Preferably, netting 240 is connected to and supported by framework 14 or periphery 76 of substrate 16.

As may be apparent from the preceding description, numerous changes may be made in the above embodiments without departing from the scope of the invention. For example, the display screen may be circular or any other geometric shape and may include a rigid, pre-existing substrate such as a billboard through which holes may be drilled and to which the terminal housings may be attached. Therefore, the embodiments described in the drawings are intended to be illustrative in nature and are not meant to be interpreted as limiting the following claims.

We claim:

1. A display system for forming a display image of greater size than a corresponding source image, the display system including multiple optical conductors each of which includes at opposite ends thereof an input terminal and an output terminal; an input matrix for holding multiple input terminals that receive light carrying the source image; and a display matrix protruding from a support surface for holding multiple output terminals, wherein the input terminals are mounted in closely packed rows and columns in the input matrix and the display matrix holds the output terminals in spaced-apart rows and columns whose relative positioning corresponds with the relative positioning of the rows and columns of the input matrix, whereby the light delivered to the input terminals is carried along the optical conductors and delivered to the output terminals to form the display image, comprising:

terminal housings to support the output terminals within the display matrix, each terminal housing having a generally concave conical shape with a base generally tangent to the support surface, and an apex having a channel through which at least one output terminal extends.

2. The display system of claim 1 in which light emitted from each output terminal propagated through a viewing angle enhancer.

3. The display system of claim 2 in which the viewing angle enhancer comprises a lens.

4. The display system of claim 2 which comprises a transparent light scattering epoxy material.

5. The display system of claim 2 which comprises an optical grating.

6. The display system of claim 2 which comprises a holographic optical element.

7. The display system of claim 2 which comprises a terminal cap attached to each output terminal.

8. The display system of claim 4 in which the epoxy envelopes small gas bubbles.

9. The display system of claim 1 further comprising an imaging medium positioned adjacent to the input matrix to provide the source image for impingment into the input matrix.

10. The display system of claim 9 in which the optical conductors have a core and a cladding with distinct refractive indices, the display system further comprising:

a reflector assembly including:

- an input aperture for receiving light from a light source;
- an output aperture through which the light exits the reflector assembly to impinge on the imaging medium and is transferred to the input terminals of the input matrix, the output aperture being larger than the input aperture;
- a reflector head having at least one pair of reflective surface sections positioned between the input aperture and the output aperture to direct reflected light toward the imaging medium; and
- a bisecting axis that bisects the reflector head such that the surface sections diverge from the axis within about 15% of an angle $\theta_{RD}$, where $$\Theta_{RD} = \frac{2\sin^{-1}\sqrt{(n_1^2 - n_2^2)}}{4};$$

where $n_1$ is the refractive index of the core of the optical conductors and $n_2$ is the refractive index of the cladding of the optical conductors.

* * * * *